United States Patent
Yasutake

(10) Patent No.: US 11,822,228 B2
(45) Date of Patent: Nov. 21, 2023

(54) IMAGING DEVICE

(71) Applicant: CANON KABUSHIKI KAISHA, Tokyo (JP)

(72) Inventor: Yuta Yasutake, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 190 days.

(21) Appl. No.: 17/580,275

(22) Filed: Jan. 20, 2022

(65) Prior Publication Data
US 2022/0236624 A1 Jul. 28, 2022

(30) Foreign Application Priority Data
Jan. 25, 2021 (JP) .................. 2021-009533

(51) Int. Cl.
*G03B 5/00* (2021.01)
*G03B 17/12* (2021.01)
*G03B 17/56* (2021.01)

(52) U.S. Cl.
CPC .............. *G03B 5/00* (2013.01); *G03B 17/12* (2013.01); *G03B 17/56* (2013.01); *G03B 2205/0053* (2013.01)

(58) Field of Classification Search
CPC ...... G03B 11/043; G03B 17/12; G03B 17/56; G03B 2205/0053; G03B 5/00; G08B 13/19619
See application file for complete search history.

(56) References Cited

U.S. PATENT DOCUMENTS

| | | | |
|---|---|---|---|
| 10,612,663 B2 | 4/2020 | Little et al. | |
| 11,050,907 B1* | 6/2021 | Yoo | G08B 13/19632 |
| 11,112,683 B1* | 9/2021 | Samsudin | G03B 17/561 |
| 2016/0255251 A1* | 9/2016 | Urano | H04N 23/56 348/143 |
| 2016/0255255 A1* | 9/2016 | Urano | H04N 23/56 348/164 |
| 2017/0115480 A1* | 4/2017 | Wada | G03B 15/02 |
| 2019/0258150 A1* | 8/2019 | Inui | G03B 21/145 |
| 2020/0174343 A1 | 6/2020 | Li et al. | |
| 2022/0103727 A1* | 3/2022 | Kei | G03B 17/12 |
| 2022/0197118 A1* | 6/2022 | Yasutake | G03B 13/20 |

* cited by examiner

*Primary Examiner* — Antoinette T Spinks
(74) *Attorney, Agent, or Firm* — Cowan, Liebowitz & Latman, P.C.

(57) ABSTRACT

The imaging device includes: at least one imaging unit configured to be rotatable with a driving mechanism and movable in a circumferential direction; an illumination; a cover configured to cover the imaging unit and the illumination; and a light-shielding member of which at least a part is disposed between the imaging unit and the illumination and is disposed in contact with the cover. The light-shielding member is able to be retracted away from the cover through driving of the driving mechanism.

13 Claims, 7 Drawing Sheets

IMAGING DEVICE

BACKGROUND OF THE INVENTION

Field of the Invention

The present invention relates to an imaging device, and more particularly, to an imaging device capable of adjusting an imaging direction through an electromotion.

Description of the Related Art

In recent years, the demand for imaging devices capable of a broad imaging range has increased. Of such imaging devices, there are imaging devices in which a plurality of imaging units can be shifted and moved in a circumferential direction centering on a central axis of a casing. Further, there are imaging devices on which illuminations are mounted to capture clear videos in the darkness. The publication of US Patent Application No. 2020/0174343 discloses a configuration in which an auxiliary light unit including an illumination can be assembled in a camera body including a plurality of imaging units.

There is also an imaging device in which an illumination is disposed in the same space as an imaging unit. When an illumination is disposed in the same space as an imaging unit, it is necessary to provide a light-shielding member between the imaging unit and the illumination in order to avoid a video of reflected light of the illumination in a transparent protective cover. As a technology useful for such a light-shielding member, U.S. Pat. No. 10,612,663 discloses a gasket that shields light so that reflected light from a protective cover does not arrive at a lens barrel in an imaging device including a plurality of imaging units.

In the configuration disclosed in US Patent Application No. 2020/0174343, however, the size of a casing may increase since an illumination is disposed in a space separate from the imaging units. On the other hand, in the configuration disclosed in U.S. Pat. No. 10,612,663, an increase in the size can be inhibited. However, when motorization is implemented to remotely adjust an imaging direction of an imaging unit, friction between a protective shield and a gasket may be a large load. As a method of solving these, a method of retracting a light-shielding member through an electromotion when an angle of field of an imaging unit is adjusted is conceivable. However, when an actuator is separately mounted to retract the light-shielding member, cost may increase and the size of the body may increase.

SUMMARY OF THE INVENTION

An embodiment of the present invention provides a technology capable of retracting a light-shielding member in a simple configuration while inhibiting an increase in the size of an imaging device capable of changing an imaging direction.

According to an embodiment of the present invention, an imaging device includes: at least one imaging unit configured to be rotatable and movable in a circumferential direction with a driving mechanism; an illumination; a cover configured to cover the imaging unit and the illumination; and a light-shielding member of which at least a part is disposed between the imaging unit and the illumination and is disposed in contact with the cover. The light-shielding member is able to be retracted away from the cover through driving of the driving mechanism.

Further features of the present invention will become apparent from the following description of exemplary embodiments with reference to the attached drawings.

DESCRIPTION OF THE EMBODIMENTS

Hereinafter, preferred embodiments of the present invention will be described in detail with reference to the appended drawings. Here, the dimensions, materials, and relative positions or the like of constituent elements to be described in the following embodiments are arbitrary and can be changed in accordance with a configuration and various conditions of a device to which an embodiment of the present invention is applied. Cables or components which are not directly involved in the embodiment of the present invention will not be described and are not illustrated. Further, to facilitate description, shapes or the like of components will be described in a simplified form in some cases.

Embodiment

Figure 1:
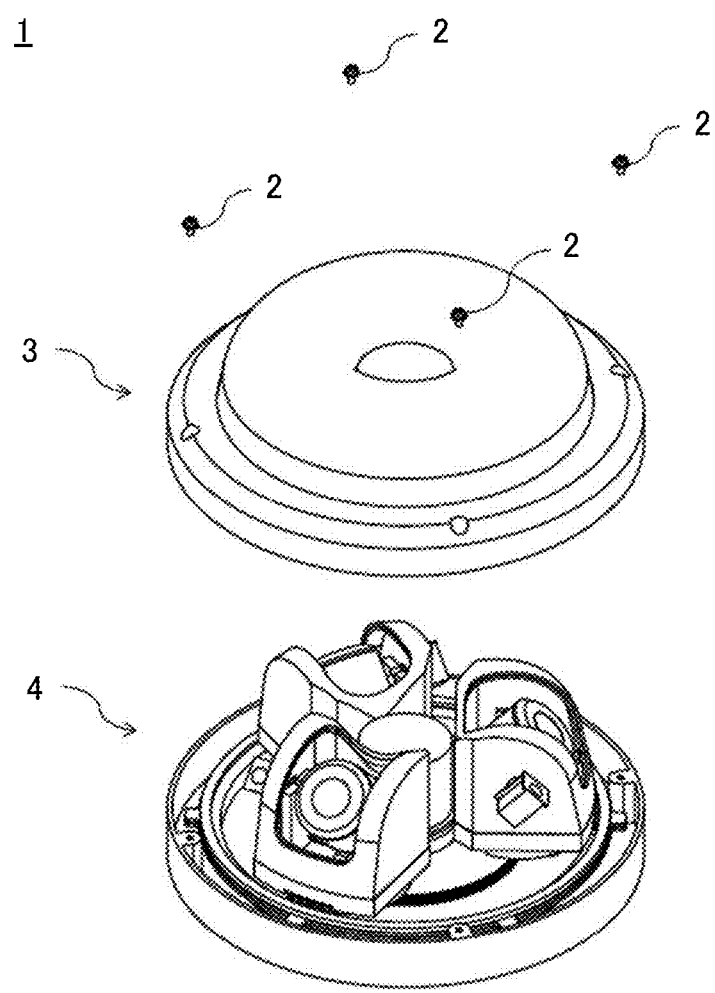
FIG. 1 is an exploded perspective view illustrating an imaging device according to an embodiment.

In an embodiment, an example of an imaging device to which the present invention is applied will be described. FIG. 1 is an exploded perspective view illustrating an imaging device 1 according to an embodiment. The imaging device 1 includes a top case unit 3 and a bottom case unit 4. The top case unit 3 is fixed to the bottom case unit 4 by fastening screws 2. A gasket (not illustrated) is disposed between the top case unit 3 and the bottom case unit 4 to inhibit intrusion of rain or dust into the imaging device 1.

Figure 2:
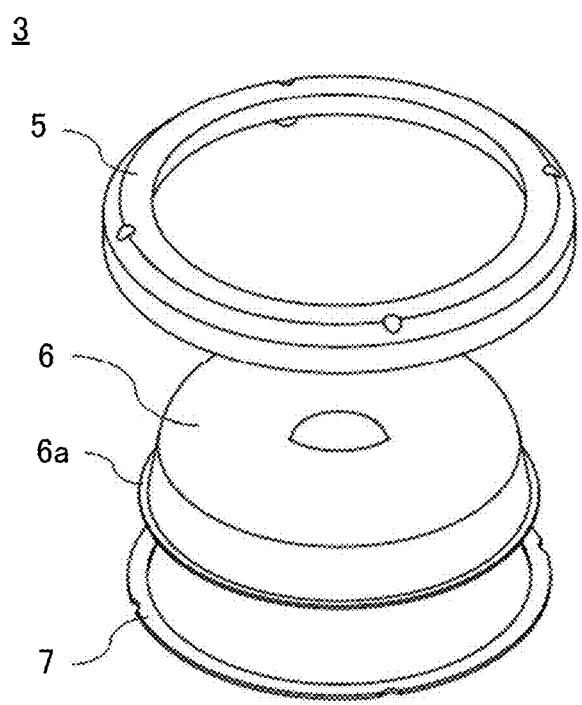
FIG. 2 is an exploded perspective view illustrating a top case unit.

FIG. 2 is an exploded perspective view illustrating the top case unit 3. The top case unit 3 includes a top case 5, a protective cover 6, and a protective cover holder 7. The protective cover 6 is a transparent member of polycarbonate or the like and protects a plurality of imaging units 9 to be described below against rain, dust, or shocks from outside. The protective cover 6 and a flange 6a are interposed between the top case 5 and the protective cover holder 7. The gasket (not illustrated) is disposed between the top case 5 and the protective cover 6 to inhibit intrusion of rain or dust into the imaging device 1.

Figure 3:
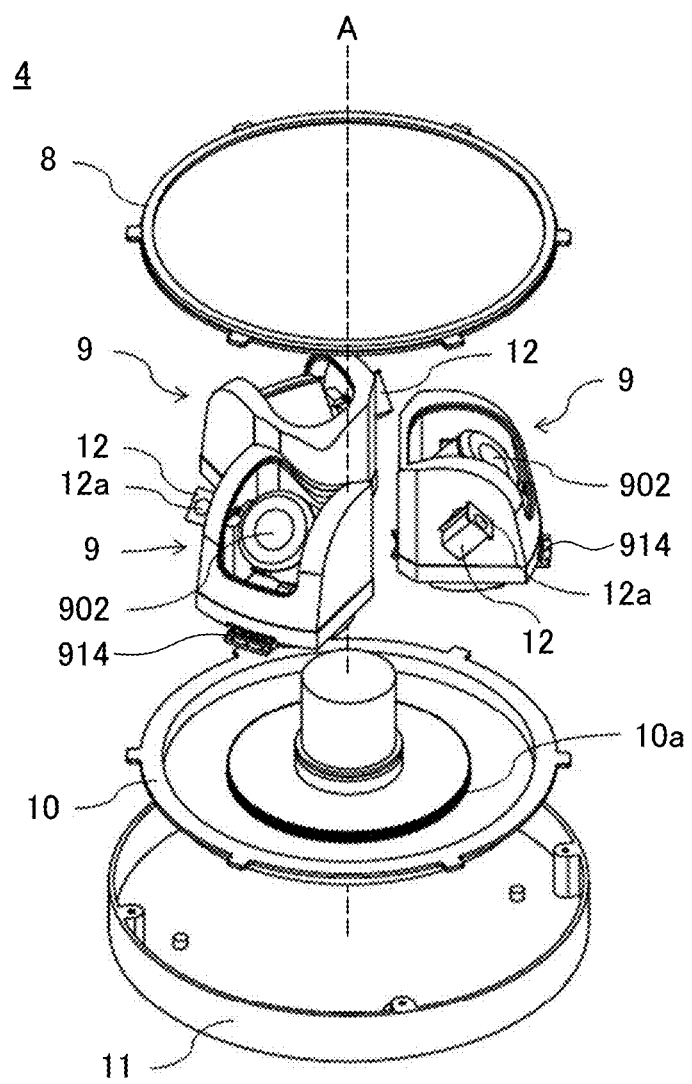
FIG. 3 is an exploded perspective view illustrating a bottom case unit.

FIG. 3 is an exploded perspective view illustrating the bottom case unit 4. The bottom case unit 4 includes an imaging unit holder 8, the plurality of imaging units 9, a shift base 10, a bottom case 11, and a plurality of infrared illumination units 12. In the embodiment, the imaging device 1 includes, for example, three imaging units 9 and three infrared illumination units 12, but it may include one or more imaging units 9 and one or more infrared illumination units 12. As the number of imaging units 9 included in the imaging device 1 is larger, a broader range can be imaged at a time.

The imaging unit 9 includes a lens barrel 902 (imaging unit) that includes an image sensor and a lens group (neither of which is illustrated) and a protrusion 914 is interposed between the imaging unit holder 8 and the shift base 10. The imaging unit 9 holds the lens barrel 902 tilting rotatably and can be shifted and moved on the shift base 10. The titling mentioned here is rotation in a vertical direction and a circumference of the shaft perpendicular to an optical shaft of the lens barrel 902 and the shifting is movement in a circumferential direction about a central axis A of the imaging device 1.

The infrared illumination unit 12 includes an infrared illumination 12a and is fixed to the imaging unit 9, as will be described below in detail.

The shift base 10 includes a spur gear 10a and is fixed to the bottom case 11. Between the shift base 10 and the bottom case 11, a printed substrate (not illustrated) on which a video engine processing an output signal of the image sensor or a network engine performing network communication is mounted is disposed.

Figure 4:
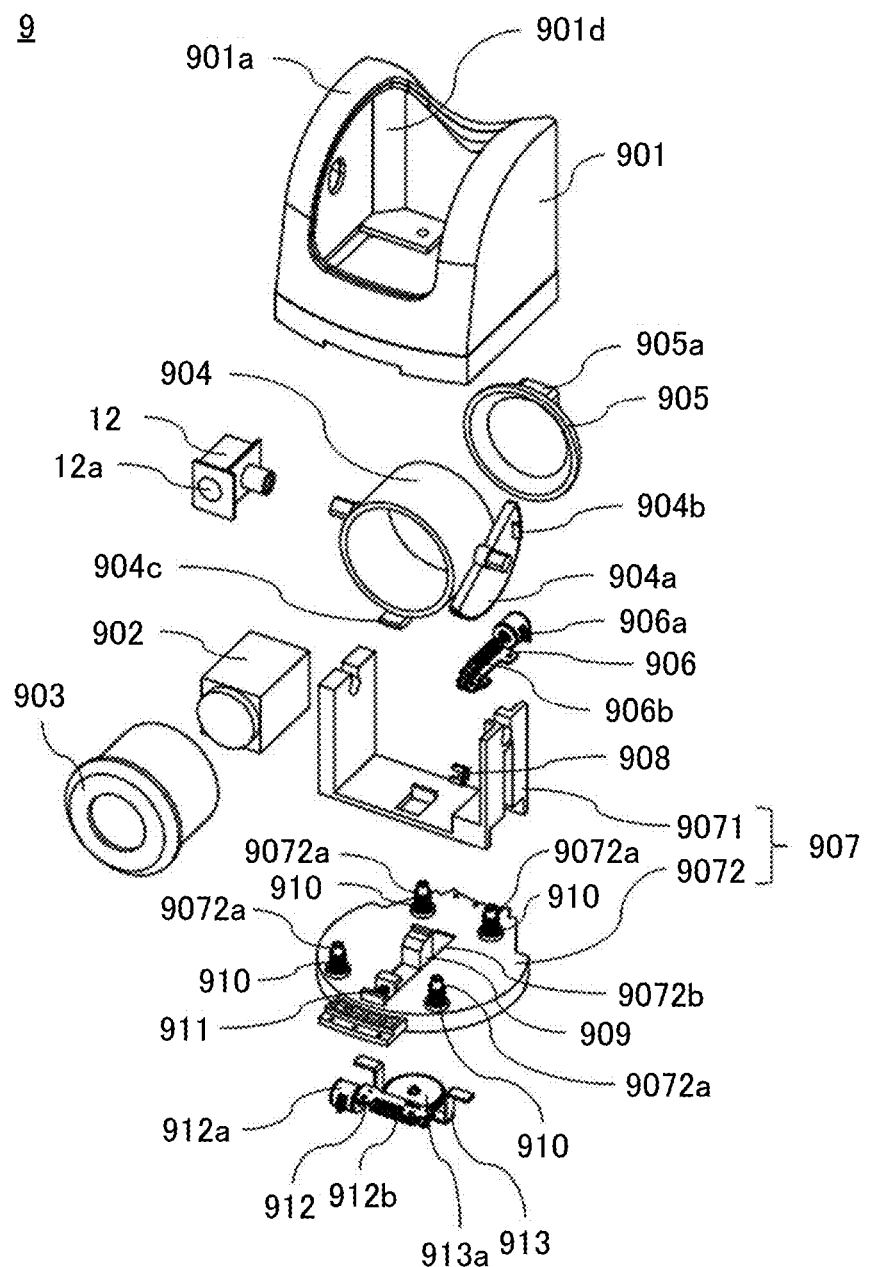
FIG. 4 is an exploded perspective view illustrating an imaging unit.
Figure 5:
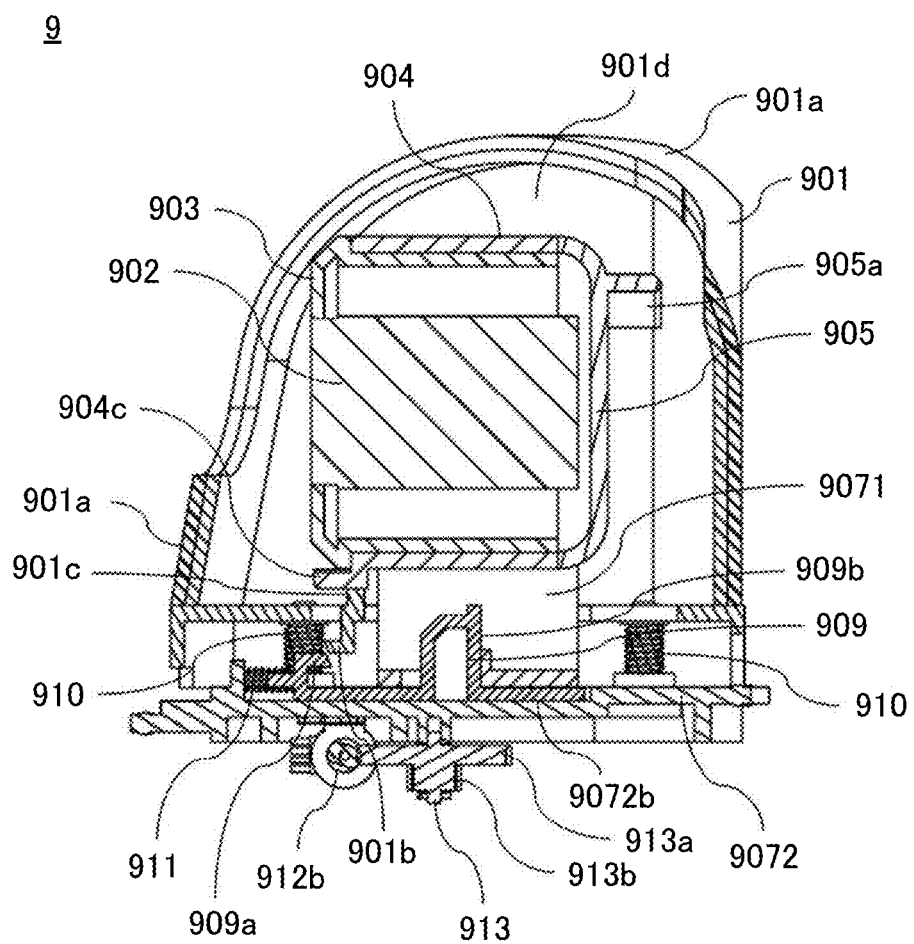
FIG. 5 is a sectional view illustrating the imaging unit.

FIG. 4 is an exploded perspective view illustrating the imaging unit 9. FIG. 5 is a sectional view illustrating the imaging unit 9. To facilitate description, the infrared illumination unit 12 fixed to the imaging unit 9 is illustrated in FIG. 4. The lens barrel 902 is fixed to a lens barrel holder 904.

The lens barrel holder 904 including a helical gear 904a for tilting, a light-shielding unit 904b for initial alignment of tilting by a photo-interrupter 908 to be described below, and a pressing unit 904c with a protrusion shape is held to be tilted with respect to a tilting base 907. A rear cover 905 including a front cover 903 and a pressing unit 905a with a protrusion shape is fixed to the lens barrel holder 904. That is, the lens barrel holder 904, the front cover 903, and the rear cover 905 serve as a holding unit that holds the lens barrel 902.

The above-described infrared illumination unit 12 is disposed in a space covered by the protective cover 6. The infrared illumination unit 12 is tilted to interlock with tilting of the corresponding lens barrel 902. The infrared illumination unit 12 is preferably fixed to the lens barrel holder 904, for example, so that a radiation direction of the infrared illumination 12a substantially matches an imaging direction of the lens barrel 902. Thus, the radiation direction of the infrared illumination 12a can substantially match the imaging direction of the lens barrel 902 regardless of a shift position and a tilting angle of the lens barrel 902, and thus it is possible to implement inhibition of radiation unevenness and a reduction in power consumption. For example, a driving mechanism for tilting of the lens barrel 902 can be used for tilting of the infrared illumination 12a without fixing the infrared illumination unit 12 to the lens barrel holder 904 to interlock with tilting of the lens barrel 902 and the infrared illumination 12a. A driving mechanism for tilting different from the lens barrel 902 can also be used to interlock with tilting of the lens barrel 902 and the infrared illumination 12a by performing control.

The tilting base 907 includes a first tilting base 9071 and a second tilting base 9072, and a lock member 909 is disposed between the first tilting base 9071 and the second tilting base 9072.

In the first tilting base 9071, a tilting motor unit 906 and the photo-interrupter 908 are disposed.

The tilting motor unit 906 includes a stepping motor 906a and a worm 906b. The worm 906b is pressed and fitted in an output shaft of the stepping motor 906a. The worm 906b engages with the helical gear 904a of the lens barrel holder 904, and thus the lens barrel 902 can be tilted along with the lens barrel holder 904 using the stepping motor 906a as a power source. That is, the tilting motor unit 906 is a driving mechanism for tilting.

The photo-interrupter 908 is mounted on a flexible substrate (not illustrated) by soldering and is started by conduction. Initial alignment of tilting is performed by detecting a position at which the light-shielding unit 904b of the lens barrel holder 904 comes between a light-emitting portion and a light-receiving portion of the photo-interrupter 908. That is, the photo-interrupter 908 is a detector that detects a tilting angle. After the initial alignment of tilting, a tilting angle is ascertained based on the number of driving pulses of the stepping motor 906a.

A shift motor unit 912 and a shift gear unit 913 are disposed in the second tilting base 9072. The shift motor unit 912 includes a stepping motor 912a and a worm 912b. The shift gear unit 913 includes a helical gear 913a and a spur gear 913b. The worm 912b is pressed and fitted in an output shaft of the stepping motor 912a. The worm 912b engages with the helical gear 913a and the spur gear 913b engages with the spur gear 10a of the above-described shift base 10, and thus the lens barrel 902 can be shifted along with the second tilting base 9072 using the stepping motor 912a as a power source.

The second tilting base 9072 includes four guide poles 9072a and one guide groove 9072b. A light-shielding unit urging spring 910 is disposed around each guide pole 9072a. A light-shielding unit 901 provided in order to shield light of the infrared illumination 12a is loosely fitted on the guide pole 9072a. In the embodiment, the light-shielding unit 901 is disposed to cover the lens barrel 902, for example. The top case unit 3 is mounted on the bottom case unit 4, the light-shielding unit urging spring 910 is compressed so that the light-shielding unit 901 is urged toward the protective cover 6 along the guide pole 9072a. A protective cover adhesion surface 901a formed of an elastic member such as rubber is adhered to the inner surface of the protective cover 6. Thus, reflected light of the infrared illumination 12a in the protective cover 6 does not arrive at the lens barrel 902, and thus the light is shielded. An elastic member such as rubber of which the protective cover adhesion surface 901a is molded can be integrated with a frame 901d formed of a resin.

The lock member 909 is disposed in the guide groove 9072b, and the lock member 909 is sandwiched between the first tilting base 9071 and the second tilting base 9072. A lock member urging spring 911 is compressed and disposed between the second tilting base 9072 and the lock member 909. The lock member 909 is urged backward along the guide groove 9072b by the lock member urging spring 911 to be held at a position at which lock member 909 comes into contact with the first tilting base 9071.

Figure 6A:
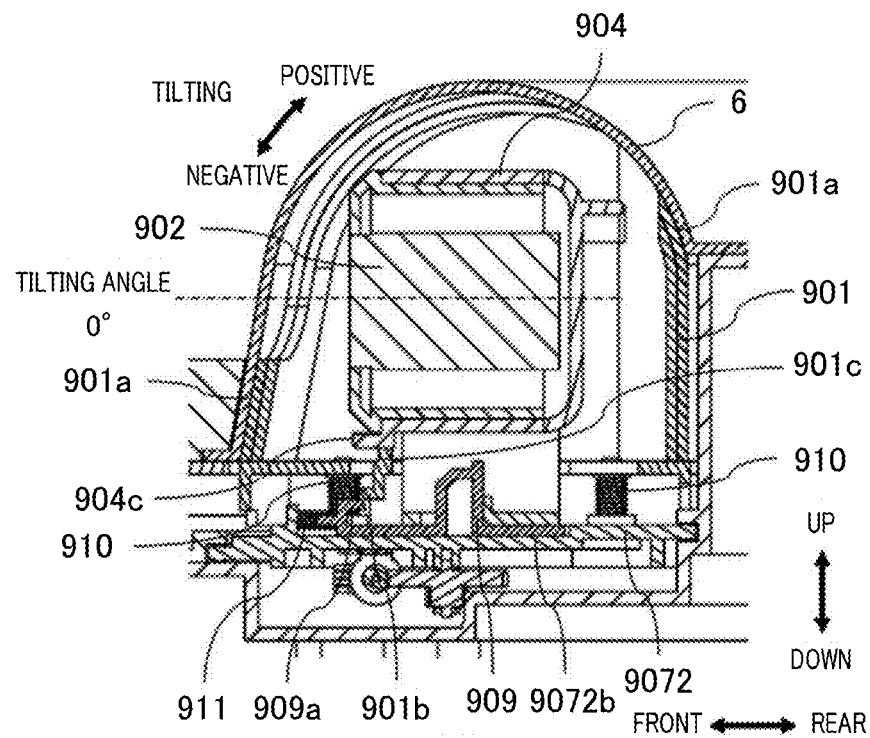
FIGS. 6A and 6B are sectional views illustrating the periphery of the imaging unit to describe a method of locking a retraction mechanism of a light-shielding unit.
Figure 6B:
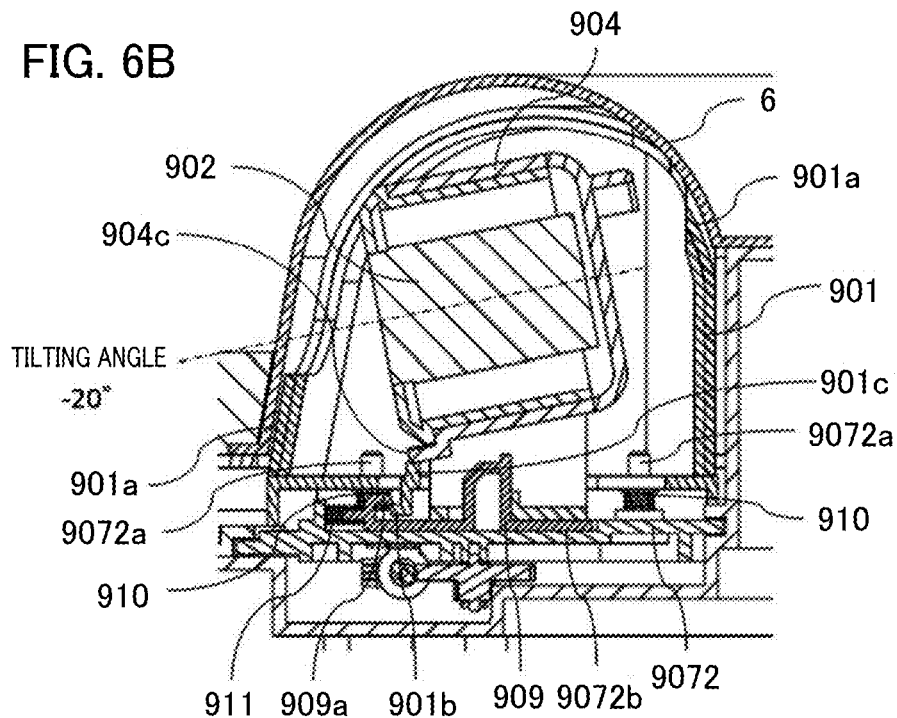
Figure 7A:
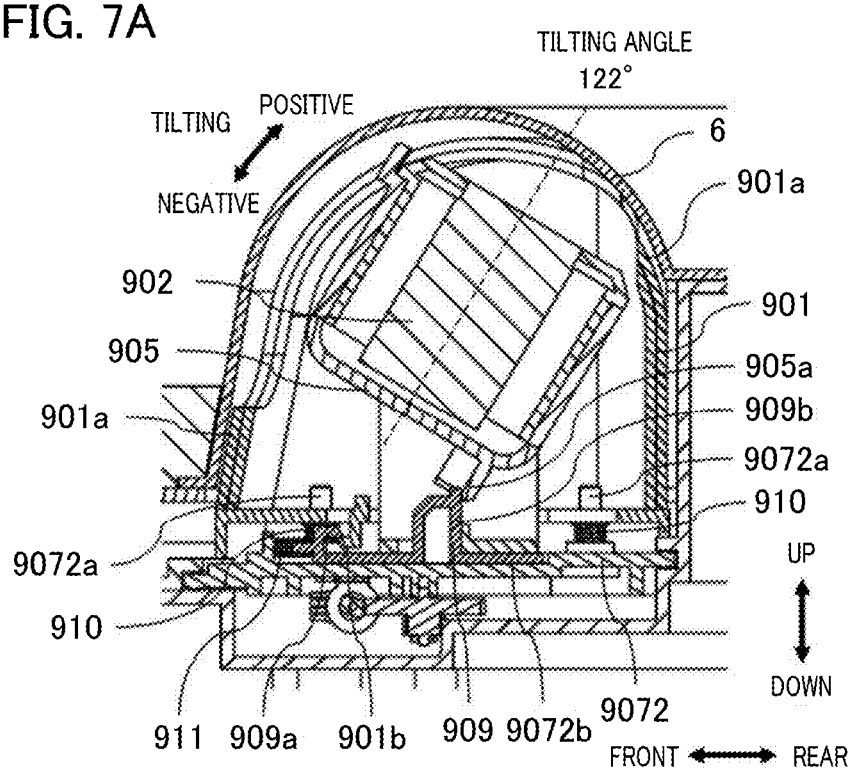
FIGS. 7A and 7B are sectional views illustrating the periphery of the imaging unit to describe a method of unlocking the retraction mechanism of the light-shielding unit.
Figure 7B:
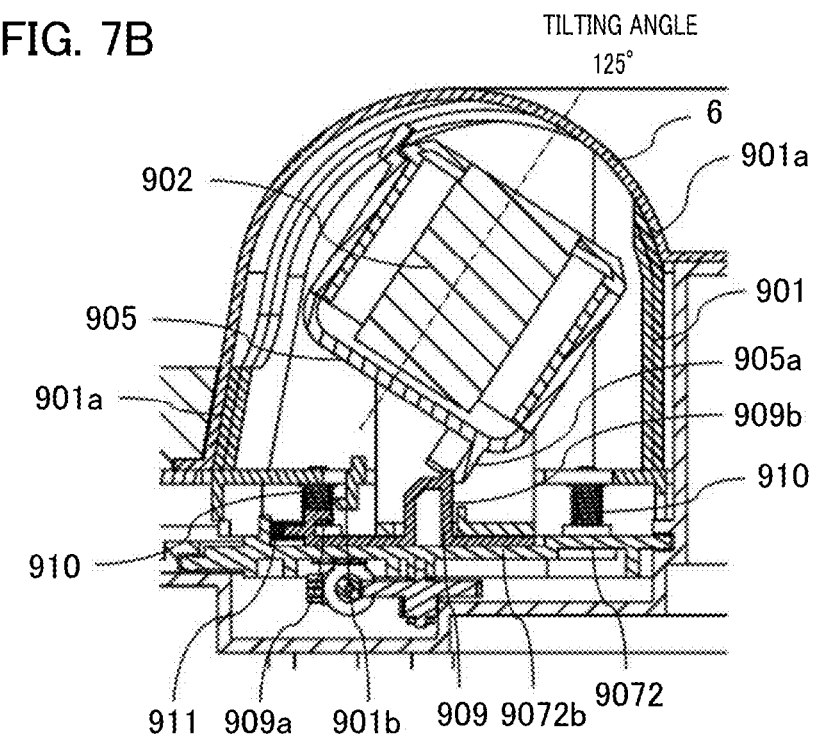

FIGS. 6A and 6B are sectional views illustrating the periphery of the imaging unit 9 to describe a method of locking a retraction mechanism of a light-shielding unit 901. FIGS. 7A and 7B are sectional views illustrating the periphery of the imaging unit 9 to describe a method of unlocking the retraction mechanism of the light-shielding unit 901. Hereinafter, up, down, front, and rear directions, positive and negative directions of tilting, and a value of a tilting angle are as shown in FIGS. 6A, 6B, 7A, and 7B. That is, an installation surface direction is a downward direction, a direction opposite to an installation surface is an upward direction, an imaging direction in which a tilting angle is 0 degrees is a forward direction, and a direction opposite to the imaging direction (the forward direction) is a rearward direction using the imaging unit 9 as a reference.

In the embodiment, when the imaging unit 9 performs imaging, a tilting angle which can be set in adjustment of an angle of field as a tilting angle at which no vignetting occurs due to the top case 5 or the light-shielding unit 901 is assumed to be in a range from +10 degrees to +120 degrees, for example. A tilting range in which rotation can be performed in adjustment of an angle of field to retract the light-shielding unit 901 is assumed to be in a range from −20 degrees to +125 degrees, for example. The tilting angle can be calculated from the number of driving pulses of the stepping motor 906a after the tilting initial alignment by the photo-interrupter 908. A tilting angle or a rotatable tilting range which can be set in adjustment of an angle of field is regulated by firmware.

First, when the light-shielding unit 901 is retracted, tilting is performed in the negative rotation direction and tilting is performed to a tilting angle of −20 degrees which is a negative end of the rotatable tilting range.

Specifically, as illustrated in FIG. 6A, at a tilting angle of 0 degrees, the pressing unit 904c of the lens barrel holder 904 comes into contact with a pressed unit 901c of the light-shielding unit 901. When the tilting is further performed in the negative rotation direction from this state, the pressing unit 904c of the lens barrel holder 904 presses the pressed unit 901c of the light-shielding unit 901 downward, so that the light-shielding unit 901 is retracted downward along the guide pole 9072a. At this time, when a slope surface of a lock claw 901b of the light-shielding unit 901 comes into contact with a slope surface of a lock claw 909a of the lock member 909, a force applied forward works on the lock claw 909a and the lock member 909 starts sliding forward along the guide groove 9072b. When the lens barrel holder 904 is rotated to a tilting angle of −20 degrees, the slope surface of the lock claw 901b does not come into contact with the slope surface of the lock claw 909a. Therefore, the lock member 909 is pushed backward along the guide groove 9072b by the lock member urging spring 911. As illustrated in FIG. 6B, the lock claw 901b engages with the lock claw 909a and a locked state, that is, a state in which the light-shielding unit 901 is retracted away from the protective cover 6, is maintained. Thus, even in a state in which the lens barrel holder 904 is not pressed against the pressing unit 904c, the light-shielding unit 901 is held at the position at which the light-shielding unit 901 is retracted downward and there is a gap between the protective cover adhesion surface 901a of the light-shielding unit 901 and the protective cover 6. Accordingly, the light-shielding unit 901 can be retracted away from the protective cover 6 using the stepping motor 906a for tilting as a power source. For example, friction does not occur between the light-shielding unit 901 and the protective cover 6 in shifting, and the lens barrel 902 can be shifted and tilted through an electromotion so that an angle of field can be adjusted. When the adjustment of the angle of field is completed, a tilting angle after the adjustment of the angle of field calculated from the number of driving pulses of the stepping motor 906a after the tilting initial alignment is stored in firmware. In the description, the tilting angle after the adjustment of the angle of field is assumed to be +45 degrees.

Subsequently, when the light-shielding unit 901 retracted downward is returned to its original position, the lens barrel holder 904 is tilted in the positive rotation direction to be tilted to a tilting angle of +125 degree which is the positive end of the rotatable tilting range.

Specifically, as illustrated in FIG. 7A, at a tilting angle of +122 degrees, the pressing unit 905a of the rear cover 905 comes into contact with a pressed unit 909b of the lock member 909. When the lens barrel holder 904 is further tilted in the positive rotation direction from this state, the pressing unit 905a of the rear cover 905 presses the pressed unit 909b of the lock member 909 forward, so that the lock member 909 slides forward along the guide groove 9072b. When the lens barrel holder 904 is rotated to a tilting angle of +125 degrees, the engaged state of the lock claw 901b of the light-shielding unit 901 and the lock claw 909a of the lock member 909 is released. Therefore, as illustrated in FIG. 7B, the light-shielding unit 901 is pushed back toward the protective cover 6 along the guide pole 9072a by the light-shielding unit urging spring 910, so that the protective cover adhesion surface 901a is adhered to the inner surface of the protective cover 6. Thereafter, when the lens barrel holder 904 is tilted in the negative rotation direction to the stored tilting angle of +45 degrees after the adjustment of the angle of field, the lock member 909 is pushed backward along the guide groove 9072b by the lock member urging spring 911 and is held at a position at which the lock member 909 comes into contact with the first tilting base 9071.

In the embodiment, the locking of the light-shielding unit in the negative end of the rotatable tilting range has been described as a mechanism that releases the lock of the light-shielding unit in the positive end of the rotatable tilting range, but the present invention is not limited thereto. For example, a mechanism that has a reverse relation thereto may be used or a mechanism that performs the locking and unlocking in the same end may be used. A configuration may be used in which the locking or unlocking is performed when the lens barrel 902 is tilted beyond the range of the tilting angle which can be set in adjustment of the angle of field despite it not being the end.

In the above-described configuration, in the imaging device which is capable of adjusting an angle of field through an electromotion and includes the plurality of imaging units disposed along a circumferential direction, the light-shielding member can be retracted even though an actuator for retracting the light-shielding member is not separately provided.

A preferred embodiment of the present invention has been described, but the present invention is not limited to such an embodiment and various modifications and changes can be made within the scope of the gist of the present invention. The light-shielding unit 901 preferably has the configuration in which the lens barrel 902 is covered, but another configuration may be used. For example, at least a part of the light-shielding unit 901 is disposed between the lens barrel 902 and the infrared illumination 12a and a surface corresponding to the protective cover adhesion surface 901a is disposed to adhere to the protective cover 6. In such disposition, a configuration may be used in which the light-shielding unit 901 can shield reflected light of the infrared illumination 12a in the protective cover 6 so that the reflected light does not arrive at the lens barrel 902. The light-shielding unit 901 can be retracted away from the protective cover 6 using the stepping motor 906a for tilting as a power source, or a stepping motor for panning or a stepping motor for rotation about an optical axis may be used.

This application claims the benefit of Japanese Patent Application No. 2021-009533, filed Jan. 25, 2021, which is hereby incorporated by reference wherein in its entirety.

What is claimed is:

1. An imaging device comprising:
   at least one imaging unit configured to be rotatable with a driving mechanism and movable in a circumferential direction;
   an illumination;
   a cover configured to cover the imaging unit and the illumination; and
   a light-shielding member of which at least a part is disposed between the imaging unit and the illumination and is disposed in contact with the cover,
   wherein the light-shielding member is able to be retracted away from the cover through driving of the driving mechanism.

2. The imaging device according to claim 1,
   wherein the imaging device includes a plurality of the imaging units, and
   wherein the plurality of imaging units are disposed along the circumferential direction.

3. The imaging device according to claim 1, wherein the light-shielding member is disposed to cover the imaging unit.

4. The imaging device according to claim 1, wherein the illumination includes an infrared illumination.

5. The imaging device according to claim 1, wherein the illumination is disposed to correspond to each imaging unit.

6. The imaging device according to claim 5, wherein the illumination is tilted with tilting of the corresponding imaging unit.

7. The imaging device according to claim 1, wherein, when the imaging unit is tilted beyond a preset tilting range, the light-shielding member is retracted away from the cover.

8. The imaging device according to claim 1, wherein, when the imaging unit is tilted to an end of a tilting range, the light-shielding member is retracted away from the cover.

9. The imaging device according to claim 1, further comprising:
   a holding unit configured to hold the imaging unit,
   wherein, when the imaging unit is tilted to a predetermined position, a part of the holding unit comes into contact with a part of the light-shielding member, so that the light-shielding member is retracted away from the cover.

10. The imaging device according to claim 1, further comprising a lock member configured to maintain a state in which the light-shielding member is retracted away from the cover.

11. The imaging device according to claim 10, wherein, when the imaging unit is tilted beyond a preset tilting range, the state of the light-shielding member held in the retracted state in which the light-shielding member is retracted away from the cover by the lock member is released.

12. The imaging device according to claim 10, further comprising:
    a holding unit configured to hold the imaging unit,
    wherein, when the imaging unit is tilted to a predetermined position, a part of the holding unit comes into contact with a part of the lock member, so that the retracted state of the light-shielding member is released.

13. The imaging device according to claim 1, further comprising a detector configured to detect a tilting angle.

* * * * *